(12) United States Patent
Ogita et al.

(10) Patent No.: US 6,576,693 B2
(45) Date of Patent: Jun. 10, 2003

(54) PRE-EXPANDED PARTICLES OF POLYPROPYLENE RESIN AND INMOLDED FOAMED ARTICLE USING THE SAME

(75) Inventors: Tetsuya Ogita, League City, TX (US); Takema Yamaguchi, Houston, TX (US)

(73) Assignees: Kaneka Corporation, Osaki (JP); Kaneka Texas Corporation, Pasadena, TX (US)

( * ) Notice: Subject to any disclaimer, the term of this patent is extended or adjusted under 35 U.S.C. 154(b) by 0 days.

(21) Appl. No.: 09/919,871

(22) Filed: Aug. 2, 2001

(65) Prior Publication Data
US 2003/0060545 A1 Mar. 27, 2003

(51) Int. Cl.$^7$ .................................................. C08L 5/20
(52) U.S. Cl. ...................... 524/232; 524/230; 524/233; 524/210; 524/579; 524/570; 521/59; 521/60
(58) Field of Search .............................. 521/94; 524/210

(56) References Cited

U.S. PATENT DOCUMENTS

| | | | | | |
|---|---|---|---|---|---|
| 4,214,054 | A | * | 7/1980 | Watanabe et al. .............. | 521/95 |
| 4,347,329 | A | * | 8/1982 | Park ............................. | 521/79 |
| 4,395,510 | A | * | 7/1983 | Park ............................. | 524/230 |
| 4,540,718 | A | * | 9/1985 | Senda et al. .................. | 521/58 |
| 4,694,026 | A | * | 9/1987 | Park ............................. | 521/94 |
| 4,694,027 | A | * | 9/1987 | Park ............................. | 521/94 |
| 4,761,431 | A | * | 8/1988 | Nakamura .................... | 521/60 |
| 4,855,327 | A | * | 8/1989 | Fukui ........................... | 521/58 |
| 5,118,456 | A | * | 6/1992 | Senda et al. .................. | 264/51 |
| 5,430,069 | A | * | 7/1995 | Ogita et al. ................... | 521/60 |
| 5,605,937 | A | * | 2/1997 | Knaus .......................... | 521/60 |
| 5,716,998 | A | * | 2/1998 | Munakata et al. ............ | 521/58 |
| 6,013,687 | A | * | 1/2000 | Wirobski et al. ............. | 521/60 |
| 6,028,121 | A | * | 2/2000 | Takeda et al. ................ | 521/56 |
| 6,040,348 | A | * | 3/2000 | Delaite et al. ................ | 521/59 |
| 6,130,266 | A | * | 10/2000 | Mihayashi et al. ........... | 521/58 |
| 6,166,096 | A | * | 12/2000 | Ichimura et al. ............. | 521/59 |
| 6,214,896 | B1 | * | 4/2001 | Mogami et al. .............. | 521/58 |
| 6,273,347 | B1 | * | 8/2001 | Mihayashi et al. ........... | 239/569 |
| 6,355,696 | B1 | * | 3/2002 | Yamaguchi et al. .......... | 521/56 |

FOREIGN PATENT DOCUMENTS

JP          10-316791 A    * 12/1998   .............. C08J/9/16

* cited by examiner

*Primary Examiner*—David W. Wu
*Assistant Examiner*—Rip Lee
(74) *Attorney, Agent, or Firm*—Armstrong, Westerman & Hattori, LLP

(57) ABSTRACT

The present invention aims at preparing polypropylene resin pre-expanded particles capable of providing an inmolded expanded article which prevents pollution of a mold by polypropylene powder at molding, packed products from being damaged by friction due to vibration at transport, and powder generation at the same time. Polypropylene resin pre-expanded particles comprising a resin composition containing a fatty acid amide compound is used.

4 Claims, No Drawings

PRE-EXPANDED PARTICLES OF POLYPROPYLENE RESIN AND INMOLDED FOAMED ARTICLE USING THE SAME

BACKGROUND OF THE INVENTION

The present invention relates to polypropylene resin pre-expanded particles used for thermal insulation materials, cushioning packaging materials, returnable containers and automobile bumper cores, and in-mold expanded articles of a polypropylene resin using the above particles.

Inmolded expanded articles obtained from polypropylene are excellent in chemical resistance, heat resistance and distortion restoration rate after compression as compared to inmolded expanded articles of polystyrene, and are also excellent in heat resistance and compression strength as compared to inmolded expanded articles of polyethylene. Therefore, polypropylene resin inmolded expanded articles are widely used as cushioning packaging materials, returnable containers, automobile bumper cores and the like.

However, despite the above excellent properties in general, a polypropylene resin has a defect that it is harder and more fragile than polyethylene resins.

For these reasons, when products containing synthetic resin housing, for example, electrical appliances such as computers and televisions are wrapped by polypropylene resin expanded articles and transported, there are problems that surface of such products may be damaged due to vibration and that the expanded articles may be chipped to generate polypropylene powder. Recently, in accordance with diversification of electrical appliances particularly, more products contain emboss on the surface thereof, and color variation is also extended to dark colors such as black and gray. The above problems are remarkably seen in these products. The synthetic housing in this case means housing which has, as a basic material, an ABS resin, an ABS/PC blended resin, a poly(vinyl chloride) resin, a polyethylene resin, a polypropylene resin or the like.

In addition, there is a problem that polypropylene powder can be also generated in course of preparing polypropylene resin pre-expanded particles by friction between particles and the inner wall of a passage pipe in product line or because of mechanical impact within a transport blower. Particularly, in case of inmold expansion molding by using polypropylene resin pre-expanded particles, the above polypropylene powder adheres to the mold and the vapor slit of the mold as well as to the inside of the pipe of a molding machine, polluting the machine and preventing vapor flow to decrease moldability.

Conventionally, as a means to solve the problem with the surface scratching by expanded articles, electric appliances are once covered with a polyethylene bag and the like and then packed by the expanded articles. However, this process of packing by the expanded articles after covering electric appliances with a polyethylene bag and the like requires many steps and cost is increased because polyethylene bags must be prepared.

As a means to solve the problem with polypropylene powder generation and mold pollution due to the powder, there are a process for separating the polypropylene powder mechanically, and a process for cleaning the mold of a molding machine regularly. However, cost for the machine increases in case of the process of mechanical separation of the polypropylene powder, while productivity is remarkably decreased in case of the process of regular mold cleaning.

Also, there is a process for reducing friction between pre-expanded particles and inner wall of a passage pipe, and friction between inmolded expanded articles and a product caused by vibration in transport, by adding a lubricant to a polypropylene resin. Generally, in order to improve slip properties of a polypropylene resin, a process for adding a fatty acid amide compound is known. The fatty acid amide compound is added in an amount of 0.2 to 0.5 part by weight, at most about 1 part by weight.

The process for adding a fatty acid amide compound to the basic resin of polypropylene resin pre-expanded particles is disclosed in Japanese Patent No. 1686282, Japanese Unexamined Patent Publication No. 59876/1996 and Japanese Unexamined Patent Publication No. 209503/1999.

In Japanese Patent No. 1686282, 0.01 to 2 parts by weight of ethylene bisfatty acid amide or methylene bisfatty acid amide is added thereto aiming at making minute but uniform cell structure of a pre-expanded particle. However, the above problems cannot be solved by employing these pre-expanded particles and inmolded expanded articles using the same.

In Japanese Unexamined Patent Publication No. 59876/1996, 0.05 to 2.0 parts by weight of a fatty acid amide compound and 0.05 to 3.0 parts by weight of a metallic salt aiming at improving secondary processability of inmolded expanded articles. The above problems cannot be solved even by employing these pre-expanded particles and inmolded expanded articles using the same.

In Japanese Unexamined Patent Publication No. 209503/1999, 0.01 to 4.0 parts by weight of a mixture containing both of a polyhydric alcohol fatty acid ester and fatty acid amide are added (the fatty acid amide compound is added in an amount of 0.08 to 3.2 parts by weight according to the claims). The process aims at providing polyolefin resin expanded particles having uniform and large foam diameter which are excellent in expansion strength at expansion of polyolefin resin particles to be expanded and adhesion of particles at inmold molding, as well as surface appearance, cushioning properties and toughness of inmolded foamed articles. Examples described in this publication are limited to the cases of using a polyethylene resin, which does not cause problems mentioned above.

SUMMARY OF THE INVENTION

An object of the present invention is to prevent powder generation, thereby stopping pollution of a mold and the like at inmold expansion molding in preparation of polypropylene resin pre-expanded particles. Another object of the present invention is to provide inmolded expanded articles by which products are not damaged and polypropylene powder is not generated. According to the present invention, the above problems can be solved by using pre-expanded particles containing specific fatty acid amide and inmolded expanded articles comprising the pre-expanded particles.

That is, the present invention relates to polypropylene resin pre-expanded particles comprising a resin composition containing 2.5 to 15 parts by weight of a fatty acid amide compound based on 100 parts by weight of a polypropylene resin.

It is preferable that the fatty acid amide compound is at least one selected from the group consisting of erucic amide, oleic amide and stearic amide.

It is preferable that copolymerization ratio of butene in the polypropylene resin is at most 10% by weight.

The present invention also relates to an inmolded expanded article of a polypropylene resin comprising the above polypropylene resin pre-expanded particles, and to an inmolded expanded article of a polypropylene resin, wherein a density of the inmolded foamed article of a polypropylene resin is 10 to 45 g/l.

It is described in Japanese Unexamined Patent Publication No. 59876/1996 that a foam diameter of expanded cell becomes smaller by using fatty acid amide, and chip and crack are easily generated when the foam diameter becomes small. According to the present invention, however, a foam diameter does not become so small even if a large amount of a fatty acid amide compound is used.

Furthermore, a general expanded article has a problem that it takes time to bleed out an additive mixed to a basic resin on the article surface due to the cell structure, and thus, when the additive is to be active on the surface, the effect is not easily shown. In case of a conventional inmolded expanded article, a fatty acid amide compound is added only in a small amount, and thus bleeding amount to the surface of the inmolded expanded article becomes small. Therefore, lubricating effect caused by the fatty acid amide compound cannot be achieved sufficiently. However, according to the present invention, bleeding amount of a fatty acid amide compound can be increased and its lubricating effect can be achieved by adding the fatty acid amide compound in a large amount.

DETAILED DESCRIPTION

The polypropylene pre-expanded particle of the present invention comprises a fatty acid amide compound in polypropylene as a basic resin.

As the fatty acid amide compound, a primary amide having 15 to 22 carbon atoms is preferably used. In particular, erucic amide, oleic amide and stearic amide are useful.

An amount of the above fatty acid amide compound is 2.5 to 15 parts by weight (hereinafter referred to as parts), preferably 3.5 to 15 parts, more preferably 3.5 to 10 parts, and most preferably 4.0 to 8.0 parts. When the amount of the fatty acid amide co pound is less than 2.5 parts, sufficient effect for preventing damage to products and powder generation cannot be achieved. When it is more than 15 parts, there is an economical disadvantage that cost for preparing a resin is increased. In addition, there arises a problem that extrusion becomes unstable, causing decline in productivity when a polypropylene resin is prepared into small particles for pre-expansion by using an extruder.

By using pre-expanded particles containing a fatty acid amide compound in the basic resin, powder generation is prevented in course of preparing the pre-expanded particles, which leads to prevention of pollution of a mold and the like at inmold expansion molding.

Examples of a basic resin used for polypropylene resin pre-expanded particles of the present invention are a propylene homopolymer, an ethylene-propylene random copolymer, an ethylene-propylene block copolymer, an ethylene-propylene-butene randomterpolymer, a propylene-chlorinated vinyl copolymer, a propylene-butene copolymer, a propylene-maleic anhydride copolymer and the like, which are preferably prepared by stereospecific polymerization. These can be used alone or in combination of two or more. Among these, ethylene-propylene random copolymers or ethylene-propylene-butene random terpolymers are preferable from the viewpoint of particularly excellent versatility. The propylene resin of the present invention means a resin obtained by polymerizing propylene in a ratio of at least 80% by weight.

A copolymerization ratio of butene is preferably at most 10% by weight, more preferably at most 5% by weight in the above polypropylene resin. When the copolymerization ratio of butene is more than 10% by weight, an expanded article becomes flexible because the resin has a low melting point and low flexural rigidity, which does not seem to cause the problems with powder generation and scratches on the resin surface mentioned above. Also, it is not possible to achieve heat resistance and high strength which are characteristics of polypropylene expanded articles as opposed to those of polyethylene expanded articles.

MI (meltflow index) of the above polypropylene resin is preferably 0.1 to 50 g/10 minutes, more preferably 0.3 to 40 g/10 minutes. When melt flow index of the above polypropylene resin is less than 0.1 g/10 minutes, flowability of the resin at expanding becomes low and expansion becomes difficult. On the contrary, when it is more than 50 g/10 minutes, flowability of the resin becomes excessively high, resulting in tendencies that degree of the expansion his low and that the resin is easily shrunk after expansion.

Preferably, these polypropylene resins are not cross-linked, but these polymers may be cross-linked by peroxide or radiation. Also, other thermoplastic resins mixable with a polypropylene resin such as low density polyethylene, linear low density polyethylene, polystyrene, polybutene and ionomer may be mixed to the extent that the characteristics of the polypropylene resin is not lost. The amount of, for example, low density polyethylene, linear low density polyethylene, polybutene or ionomer is preferably at most 20 parts, while the amount of polystyrene is preferably at most 10 parts based on 100 parts by weight of a polypropylene resin.

Usually, the above polypropylene resin is melted previously by using an extruder, a kneader, a Banbury mixer, a roll or the like, and molded into a desired shape such as cylindrical, spheroid, spherical, cubic or rectangular particles having an average particle size of 0.1 to 5 mm, preferably 0.5 to 3 mm so that the resin is easily used for pre-expansion.

The polypropylene resin pre-expanded particles of the present invention are prepared from a resin composition containing fatty acid amide. However, a filler or additives such as a stabilizer, a coloring agent, an ultraviolet ray absorber, an antistatic agent and a flame retardant may be further added to the above resin composition, if necessary.

The process for preparing polypropylene resin pre-expanded particles according to the present invention is not particularly limited. However, there are useful processes as typified by a docan process (described in *Illustration IPC*, March 1988, edited by Japanese Patent Office) or a depressurization foaming (a JH method) where a foaming agent is added to basic polypropylene resin particles in a pressure vessel, the mixture is dispersed into water with stirring, and then heated to at least the softening temperature under pressure, followed by releasing the aqueous dispersion into a low pressure region. The docan process involves instantaneous expansion in a small heater, while the depressurization foaming takes 30 minutes to an h in expansion. It is more preferable to employ the depressurization foaming in the present invention.

Japanese Patent No. 1686282 discloses that pre-expanded particles are obtained according to an EPS process where polypropylene particles to which a foaming agent is previously impregnated are heated by using water vapor. Since expansion is carried out by heating from a room temperature to about 140° C. in this process, the fatty acid amide compound added thereto is solid in the initial stages, and then melts at the time of expansion to function as a nucleating agent. Therefore, a diameter of the expanded cell is as large as 400 to 500 μm.

On the other hand, in the JH method, the temperature of slurry before expansion is at least 140° C. where the fatty acid amide compound added thereto is already melted, meaning that the compound does not function as a nucleating agent. As a result, a diameter of the expanded cell is, for example, 170 to 270 μm as in usual cases.

Examples of the above foaming agent are an aliphatic hydrocarbon such as propane, butane, pentane or hexane; an alicyclic hydrocarbon such as cyclopentane or cyclobutane; a halogenated hydrocarbon such as trichlorotrifluoromethane, dichlorodifluoromethane, dichlorotetrafluoromethane, trichlorotrifluoroethane, methyl chloride, methylene chloride or ethyl chloride; inorganic gas such as carbon dioxide gas, air, nitrogen, herium or argon; water; and the like. The foaming agent can be used alone or in combination of two or more.

The amount of the above foaming agent is not particularly limited. The foaming agent can be used in a suitable amount depending on expansion degree of the propylene resin pre-expanded particles to be obtained, but normally 5 to 60 parts based on 100 parts of polypropylene resin particles. Also, bulk density of polypropylene resin pre-expanded particles is preferably from 10 to 200 g/liter.

The above aqueous dispersion is prepared by using calcium tertiary phosphate, basic magnesium carbonate, calcium carbonate or the like as a dispersant, and a little amount of a surfactant such as sodium dodecylbenzenesulfonate or sodium n-paraffinsulfonate as an auxiliary dispersant at the same time. The amount of the dispersant and surfactant differs depending on which one is used and/or the kind and the amount of the polypropylene resin particles to be used. The amount is usually 0.2 to 3 parts in case of using a dispersant and 0.001 to 0.1 part in case of using a surfactant, based on 100 parts of water.

Also, it is preferable that polypropylene resin particles containing the above foaming agent is added in an amount of 20 to 100 parts based on 100 parts of water in order to improve dispersability of the particle in water.

The thus prepared aqueous dispersion is heated to expansion temperature in a pressure vessel under pressure, released to a lower pressure area through an orifice having openings whose diameter is 2 to 10 mm to pre-expand polypropylene resin particles, and the polypropylene resin pre-expanded particles of the present invention are obtained. The kind of the above pressure vessel is not particularly limited, and any one can be used as long as the vessel is tolerable of the above pressure and temperature. Specific examples thereof are an autoclave type pressure vessel and the like.

As a process for preparing an inmolded expanded article from the pre-expanded particles of the present invention, a process comprising filling polypropylene resin pre-expanded particles in a mold which can be closed but not sealed, heating the particles by steam or the like, melt-adhering the expanded particles with each other and molding them along the mold is adopted as described in Japanese Examined Patent Publication 22951/1976 and Japanese Examined Patent Publication 59694/1994.

The density of the thus obtained inmolded expanded article is preferably 10 to 45 g/liter, more preferably 15 to 35 g/liter. When the density of an inmolded expanded article is less than 10 g/liter, there is a tendency that coefficient of shrinkage becomes large and deformation occurs easily. When it is more than 45 g/liter, there is a tendency that the article is too hard to be used as a cushioning packaging material.

The inmolded expanded article of the present invention is useful as a cushioning packaging material for transportation of products with synthetic resin housing since the article does not cause damage to products or generate polypropylene powder.

Hereinafter, the present invention is explained in detail based on Examples and Comparative Examples. But the present invention is not limited thereto.

Evaluation in Examples and Comparative Examples was carried out according to the following methods.

(Bulk density)

A precise weight W (g) of pre-expanded particles having a volume of 10,000 cm³ was measured by using a 10,000 cm³ bucket to calculate the bulk density D (g/cm³) of the pre-expanded particles by the following equation:

$$D \ (g/cm^3) = \frac{W \ (g)}{10,000 \ (cm^3)}$$

(Melt Adhesion Rate)

Molded articles were broken, observed at its cross section and a ratio of broken particles to the all particles on the cross section was determined. Evaluation was made based on the following criteria: Melt adhesion rate is at least 60% as the satisfactory molded article.

◎: ratio of broken particles is 80% or more
○: ratio of broken particles is between 60 to 80%
×: ratio of broken particles is less than 60%

(Amount of Generated Pre-expanded Particle Powder,)

Pre-expanded particles were washed with a pH 2 aqueous solution to remove the dispersant on the particle surface and dried. Then, 500 g of the pre-expanded particles were circulated in a blower equipped with a blade and a 3 m long plastic tube for particle circulation (type 4C329; rotation speed: 3,500 rpm; blade diameter: 12.5 inches made by Dayton Corporation) for 5 minutes.

To a capped glass vessel were added 10 g of the circulated pre-expanded particles and 100 ml of ethanol. The vessel was vigorously shaken up and down for 30 seconds to wash away powder from the particle surface. Then, 50 ml of ethanol out of the mixture was filtered through a teflon filter whose hole diameter is 5 μm to quantify the filtered amount of polypropylene powder W (mg), and the amount of generated pre-expanded particle powder X (ppm) was calculated by the equation shown below. Evaluation was made based on the following criteria:

◎: amount of generated polypropylene powder is at most 100 ppm
○: amount of generated polypropylene powder is between 100 to 250 ppm
Δ: amount of generated polypropylene powder is between 250 to 500 ppm
×: amount of generated polypropylene powder is at last 500 ppm $$X \ (ppm) = \frac{W \ (mg)}{10 \ (g) \ (beads \ weight)} \times 2 \times 10^3$$

(Effect on Products Caused by Molded Article)

A computer whose surface comprises an ABS resin with emboss was packed by an inmolded expanded article and placed in a carton. The carton was shaken under ISTA-1C test conditions (random vibration method), and the surface of the ABS resin was observed. Evaluation was made based on the following criteria:

⊚: No change is observed.
○: White traces are slightly observed.
Δ: White traces are observed.

x: White traces are observed and polypropylene powder is generated.

pressure of 0.24 MPa to prepare inmolded expanded articles whose characteristics were shown in Table 1.

Properties of each inmolded expanded article of pre-expanded particles were evaluated according to the above evaluation criteria. The results are shown in Table 1.

TABLE 1

| | Fatty acid amide | | Pre-expanded particles | | | Properties of molded article | | Vivration test |
| | | | | | | | | Surface |
| | Kind | Amount (part) | Bulk density (g/L) | Amount of generated powder | Expansion ratio (times) | Density (g/L) | Melt-adhesion | condition of ABS resin |
|---|---|---|---|---|---|---|---|---|
| Ex. 1 | eruic acid amide | 2.5 | 19 | ⊚ | 26 | 22 | ⊚ | ⊚ |
| Ex. 2 | eruic acid amide | 3.5 | 19 | ⊚ | 26 | 22 | ⊚ | ⊚ |
| Ex. 3 | eruic acid amide | 5.0 | 18 | ⊚ | 28 | 21 | ⊚ | ⊚ |
| Ex. 4 | eruic acid amide | 10.0 | 16 | ⊚ | 31 | 19 | ⊚ | ⊚ |
| Ex. 5 | oleic acid amide | 5.0 | 17 | ⊚ | 29 | 20 | ⊚ | ⊚ |
| Ex. 6 | stearic acid amide | 5.0 | 17 | ⊚ | 29 | 20 | ⊚ | ⊚ |
| Ex. 7 | eruic acid amide | 2.5 | 18 | ⊚ | 28 | 21 | ⊚ | ⊚ |
| | oleic acid amide | 2.5 | | | | | | |
| Ex. 8 | eruic acid amide | 2.5 | 18 | ⊚ | 28 | 21 | ⊚ | ⊚ |
| | stearic acid amide | 2.5 | | | | | | |
| Ex. 9 | oleic acid amide | 2.5 | 18 | ⊚ | 28 | 21 | ⊚ | ⊚ |
| | stearic acid amide | 2.5 | | | | | | |
| Com. Ex. 1 | — | — | 18 | x | 28 | 21 | ⊚ | x |
| Com. Ex. 2 | eruic acid amide | 1.0 | 19 | Δ | 26 | 22 | ⊚ | Δ |
| Com. Ex. 3 | oleic acid amide | 1.0 | 19 | Δ | 26 | 22 | ⊚ | Δ |
| Com. Ex. 4 | stearic acid amide | 1.0 | 19 | Δ | 26 | 22 | ⊚ | Δ |

EXAMPLES 1 to 9

Comparative Examples 1 to 4

One hundred parts of an ethylene propylene random copolymer (ethylene content: 2.5%; MI=6.0 g/10 minutes; melting point: 146° C.) was mixed with fatty acid amide in amounts shown in Table 1. The mixture was kneaded in a single screw extruder and pelletized to prepare resin particles (1.8 mg/particle).

A 10 liter pressure vessel was charged with 100 parts (=1,500 g) of the above resin particles and 12.9 parts of isobutane together with a dispersing medium (300 parts of water containing 2 parts of basic calcium tertiary phosphate powder and 0.05 part of sodium n-paraffinsulfonate). The temperature inside the vessel was heated to 143.0° C. Next, isobutane was pressed into the vessel to adjust the pressure inside the vessel to the expansion pressure of 1.86 MPa. Thereafter, while keeping the pressure inside the vessel with nitrogen, a valve provided at the lower part of the pressure vessel was opened to release the dispersion into atmospheric pressure through an orifice plate having openings whose diameter is 4.0 mm. Then, pre-expanded particles having each bulk density shown in Table 1 were obtained.

The obtained pre-expanded particles were filled in a mold having a size of 450 mm×300 mm×60 mm, heated and melt-adhered with each other by using water vapor under By using the pre-expanded particles of the present invention, pollution of a mold by polypropylene powder at molding can be prevented. Also, by using the inmolded expanded articles obtained from the pre-expanded particles of the present invention, there is no case where packed products are damaged by friction due to vibration at transport, and powder generation can be prevented at the same time.

What is claimed is:

1. A polypropylene resin pre-expanded particle comprising a resin composition containing a polypropylene resin having a copolymerization ratio of butene of at most 10% by weight, and 2.5 to 15 parts by weight of a fatty acid amide compound based on 100 parts by weight of the polypropylene resin.

2. The polypropylene resin pre-expanded particle of claim 1, wherein the fatty acid amide compound is at least one selected from the group consisting of erucic amide, oleic amide and stearic amide.

3. An inmolded expanded article of a polypropylene resin comprising the polypropylene resin pre-expanded particle of claim 1.

4. The inmolded expanded article of a polypropylene resin of claim 3, wherein a density of the inmolded expanded article is 10 to 45 g/liter.

* * * * *